United States Patent [19]

Yamamoto et al.

[11] Patent Number: 5,032,975
[45] Date of Patent: Jul. 16, 1991

[54] CONTROLLER FOR AUTOMATIC ASSEMBLING APPARATUS

[75] Inventors: Toshihiro Yamamoto; Yusaku Azuma, both of Yokohama; Masateru Yasuhara, Kawasaki; Takeo Tanita, Kawasaki; Shozo Kasai, Kawasaki, all of Japan

[73] Assignee: Canon Kabushiki Kaisha, Tokyo, Japan

[21] Appl. No.: 227,551

[22] Filed: Aug. 3, 1988

[30] Foreign Application Priority Data

Aug. 7, 1987 [JP] Japan ................... 62-291253

[51] Int. Cl.$^5$ ................... G05B 15/00; G06F 15/46
[52] U.S. Cl. ................... 364/134; 364/474.11
[58] Field of Search ............... 414/331; 364/131–134, 364/138, 188, 474.11, 513, 200 MS File, 900 MS File

[56] References Cited

U.S. PATENT DOCUMENTS

| | | | |
|---|---|---|---|
| 4,698,766 | 10/1987 | Entwistle et al. | 364/474.11 |
| 4,814,969 | 3/1989 | Kiyooka | 364/513 |
| 4,831,582 | 5/1989 | Miller et al. | 364/138 |
| 4,837,704 | 6/1989 | Lengefeld | 364/132 |
| 4,844,680 | 7/1989 | Kawata et al. | 414/331 |
| 4,847,775 | 7/1989 | Roch et al. | 364/131 |

Primary Examiner—Jerry Smith
Assistant Examiner—Jim Trammell
Attorney, Agent, or Firm—Fitzpatrick, Cella, Harper & Scinto

[57] ABSTRACT

A controller for an automatic assembling apparatus consisting of a plurality of operation units each of which has a variety of devices to be driven and which perform independent, different operations under the program control is disclosed. This controller includes a host control unit expressing a sequence control portion of program control for the plurality of operation units by multitask program control, a plurality of lower-order control units having control programs for controlling an independent operation of each of the plurality of devices to be driven, and a shared memory which is connected to the host control unit and the plurality of lower-order control units, and is shared and accessed by the host control unit and the lower-order control units.

18 Claims, 15 Drawing Sheets

| MULTI TASK OS | | | | |
|---|---|---|---|---|
| ROBOT TASK | STOCKER TASK | ELEVATOR TASK | BUFFER TASK | RS HANDLER TASK |
| TASK COMMON VARIABLES | | | | |
| ROBOT APPLICATION PROGRAM | STOCKER APPLICATION PROGRAM | ELEVATOR APPLICATION PROGRAM | BUFFER APPLICATION PROGRAM | |
| ROBOT TEACHING POINTS | STOCKER TEACHING POINTS | ELEVATOR TEACHING POINTS | BUFFER TEACHING POINTS | |

FIG. 5

|   | CH1 | CH2 | CH3 |
|---|---|---|---|
|   | MB NUMBER | MB NUMBER | MB NUMBER |

0 : OPEN   2 : STOCKER   4 : BUFFER
1 : ROBOT  3 : ELEVATOR

FIG. 7

|   |   | NUMBER OF TRANSFER BYTES | OPERATION INSTRUCTION CODE | PARAMETER |
|---|---|---|---|---|
| ROBOT | 000 |   |   |   |
| STOCKER | 100H |   |   |   |
|   | 200H |   |   |   |

FIG. 13

|  | RS HANDLER (CH1~CH3) | ROBOT TASK | STOCKER TASK | ELEVATOR TASK | BUFFER TASK | START-UP TASK |
|---|---|---|---|---|---|---|
| START ADDRESS | | | | | | |
| REGISTRATION FLAG | | | | | | |
| START FLAG | | | | | | |
| INTERRUPTION FLAG | | | | | | |
| INPUT WAIT FLAG | | | | | | |
| I/O COMPLETION WAIT FLAG | | | | | | |
| ASSIGNMENT WAIT FLAG | | | | | | |
| MAIL BOX DATA FLAG | | | | | | |
| ASSIGNMENT STATE FLAG | | | | | | |

FIG. 8

CONTROLLER FOR AUTOMATIC ASSEMBLING APPARATUS

RELATED APPLICATIONS

The present invention is directly and indirectly related to the following patent applications: U.S. patent application Ser. No. 903,412, U.S. patent application Ser. No. 887,130, and the patent application "Automatic Article Feeding Apparatus" filed to the U.S. Patent Office on the same filing date as the present U.S application.

BACKGROUND OF THE INVENTION

1. Field of the Invention

The present invention relates to a controller for controlling an automatic assembling apparatus such as an automatic assembling robot and, more particularly, to an improvement, i.e., a simple arrangement of an automatic assembling apparatus.

2. Prior Art

Conventional automatic assembling apparatuses are largely classified into a so-called "line system" and a "non-line system".

In the "line system", a plurality of automatic assembling apparatuses aligned in an assembling order sequentially assemble a final product from one part. In the "line system" automatic assembling apparatus, an assembling robot has a single function, and supply of parts necessary for assembly is also simple. Therefore, the assembling apparatus and a controller therefor have a one-to-one correspondence. In other words, one assembling apparatus requires one controller.

On the other hand, in the "non-line system", one automatic assembling apparatus assembles a final product from a plurality of parts. For example, U.S. patent application Ser. Nos. 903,412 and 887,130 mentioned above and "Article Feeding Apparatus" filed to the U.S. Patent Office on the same date as the present application are known. In these non-line system automatic assembling apparatuses, functions such as feeding of parts to an assembling robot, supply of parts to a supply means of the parts, and replenishment from external equipment (e.g., warehouse) to the supply means are important.

In the "non-line system" automatic assembling apparatus, if the number of parts to be assembled is increased, assembling processes are complicated, and parts supply to the robot is also complicated. As a result, not only in assembly but also in parts supply to the robot, precise control, especially, control synchronous with an assembling operation of the robot, is necessary.

In this case, a plurality of so-called robot controllers are merely connected to eliminate the conventional drawbacks. In the conventional controller, since the number of shafts and the number of inputs/outputs that can be controlled by one controller are limited, if the number of shafts and the number of input/output points exceed this limitations, a plurality of controllers must be arranged. However, even though the control size is enlarged, an increase in number of controllers results in disadvantages in terms of cost, power consumption, occupying area, and the like.

An increase in number of controllers also causes the following disadvantages. That is, the assembly, feeding, supply, and replenishment functions must be independently operated in view of efficient assembly. For this purpose, teaching must be performed in units of functions. Since teaching requires an operation unit and a display unit, if a controller is provided for each function, the operation unit and the display unit must be provided to each function unit. A plurality of sets of operation units and display units will not be basically operated at the same time. Therefore, it is inefficient to arrange a plurality of operation units and display units. An increase in number of controllers also results in the following drawback. That is, in an NC machine such as a robot assembling apparatus, a teaching pendant (=input console of teaching data) is used for teaching. If a plurality of controllers are arranged, teaching must be performed for each controller, and data must be input using the teaching pendant while moving to each controller, making operation cumbersome.

SUMMARY OF THE INVENTION

The present invention has been made in consideration of the above situation and has as its object to provide a controller for an automatic assembling apparatus which need not be extended unlike a conventional controller even if a control size of the automatic assembling apparatus is increased.

In order to achieve the above object, according to the present invention, a controller for an automatic assembling apparatus consisting of a plurality of operation sections each of which has a variety of devices to be driven and which perform independent, different operations under the program control, comprises a host control unit which control a sequence control portion of program control for each of the plurality of operation sections as multitask program control, a plurality of lower-order control units having control programs for controlling an independent operation of each of the plurality of devices to be driven, and shared resource means which is connected to the host control unit and the plurality of lower-order control units, and is shared and accessed by all these control units.

According to the present invention with the above arrangement, even if the control size of the automatic assembling apparatus is increased, a sequence control portion of program control for an operation section associated with an increased portion can be coped with by an increase in the number of programs under the multitask control. Since a program of each lower-order control unit simply expresses an independent operation of each device to be driven, even if devices to be driven are increased in number due to an increase in control scale, only programs expressing independent operations of the increased devices to be driven are added.

According to an aspect of the present invention, a program for each of the plurality of operation sections has a step of driving the device to be driven. The multitask program has a routine of interpreting the step of driving the device to be driven, breaking down the step to a simplified instruction for an independent operation of each device to be driven, and storing the instruction in the shared resource means. The control program of each lower-order control unit has a routine of fetching the simplified instruction for the device to be driven from the shared resource means, and interpreting and executing the instruction.

According to the aspect of the present invention, the devices to be driven comprise a motor, a sensor, and a solenoid.

According to the aspect of the present invention, the shared resource means comprises a shared memory.

According to the aspect of the present invention, the shared resource means comprises a common bus.

According to the aspect of the present invention, the sequence control portion for the plurality of operation sections and the multitask control program are stored in a local memory of the host control unit. Therefore, in the host control unit, multitask control can be performed by a single microprocessor.

It is another object of the present invention to provide a controller which need not be extended and in which input/output means need not be extended unlike a conventional apparatus even if a control size of an automatic assembling apparatus is increased.

In order to achieve the above object, according to the present invention, a controller for an automatic assembling apparatus consisting of a plurality of operation sections each of which has a variety of devices to be driven and which perform independent, different operations under the program control, comprises a control unit which controls each of the plurality of operation sections as multitask program control, input/output means for inputting data in the control unit and displaying data output from the control unit, means for executing a program under the multitask program for exchanging input/output data between the input/output means and the control unit, and shared resource means which is shared and accessed by the control unit and the means for executing the program.

According to the present invention with the above arrangement, an increase in control size can be coped with only by increasing the number of programs under the multitask program. Since the input/output means can exchange data with other tasks by the shared resource means, the input/output means need not be extended.

According to another aspect of the present invention, the means for executing the program comprises a board open to the input/output means and a mail box open to a program for each of the plurality of operation sections.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 shows a program hierarchy in multitask control;

FIG. 7 shows a format of an assignment register;

FIG. 8 shows a format of a task control box;

FIG. 13 shows a format of interface data between the main block and the lower-order control block.

DESCRIPTION OF THE PREFERRED EMBODIMENT

An arrangement of an embodiment wherein the present invention is applied to a controller for an automatic assembling/parts feeding apparatus will be described hereinafter in detail with reference to the accompanying drawings. Note that the automatic assembling/parts feeding apparatus is an automatic assembling/parts feeding apparatus consisting of a robot, stocker, elevator, and buffer, and disclosed in the specification filed to the U.S. Patent Office on the same date as the present application.

Arrangement of Automatic Assembling/Parts Feeding Apparatus

Figure 1:
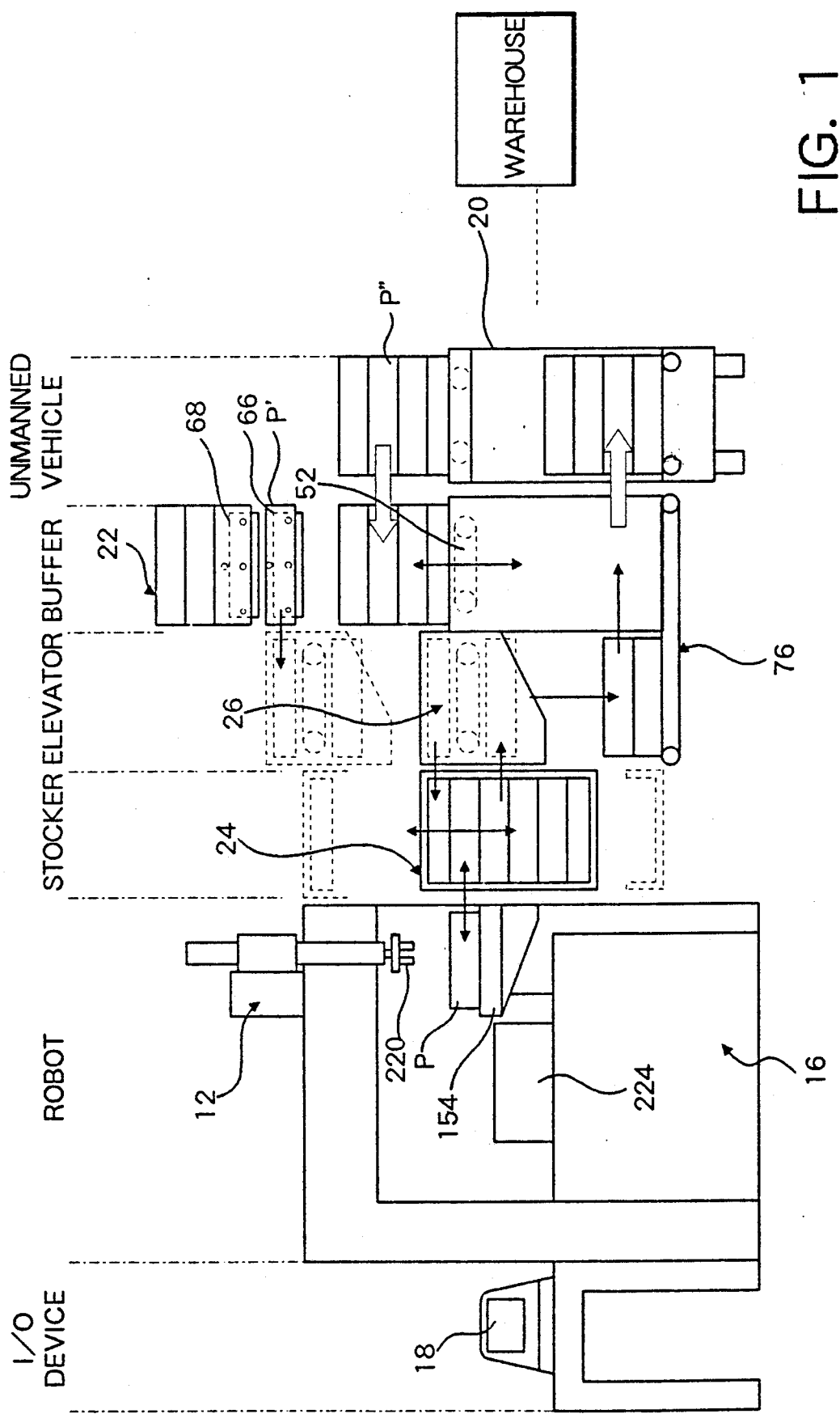
FIG. 1 is a view showing an arrangement of an automatic assembling/feeding apparatus including a controller to which the present invention is applied.

FIG. 1 shows an overall arrangement of an automatic assembling/parts feeding apparatus 10. The automatic assembling/parts feeding apparatus 10 comprises:

an X-Y automatic assembling apparatus (to be simply referred to as a robot) 12 for automatically assembling a predetermined product from a plurality of parts;

a stocker 24 for feeding parts to the robot 12, the stocker 24 stacking and stocking pallets p each two-dimensionally storing a plurality of parts on shelves, selecting a pallet p storing the parts corresponding to an assembling order from the plurality of pallets in response to a command from the robot 12, and drawing out the selected pallet p to a draw-out position 154 of the pallet p;

a buffer 22 for stacking and storing pallets filled with parts on a base 52 to prepare for a case wherein parts in pallets p stocked in the stocker 24 are used up, the buffer 22 separating only one pallet p' requested by the robot 12 from a stack of pallets by separating members 66 and 68;

an elevator 26 for receiving the pallet p' separated by the buffer 22 and vertically moving the received pallet to a shelf position of an empty pallet p in the stocker 24 to transfer a new pallet p, thereby replacing the empty pallet p with the new pallet p';

an unloading mechanism 76 for stacking and unloading replaced empty pallets p;

an unmanned vehicle 20 for replenishing a new pallet p" from external equipment (e.g., warehouse) to the buffer 22;

an input/output (I/O) device 18 for inputting operation programs (=application programs or the like) of the robot 12, the stocker 24, the elevator and the buffer 22, and teaching points for the units;

a controller 16 for storing the control programs for the robot, stocker, and the like, and driving the robot, stocker, and the like in accordance with the control programs; and the like.

A usual personal computer system is utilized as the I/O device 18. Note that a finger 220 of the robot 12 takes out parts one by one from the pallet p drawn out on a draw-out unit 154, and assembles parts on an assembling base 224 one by one to finish a product.

Arrangement of Controller

Figure 2:
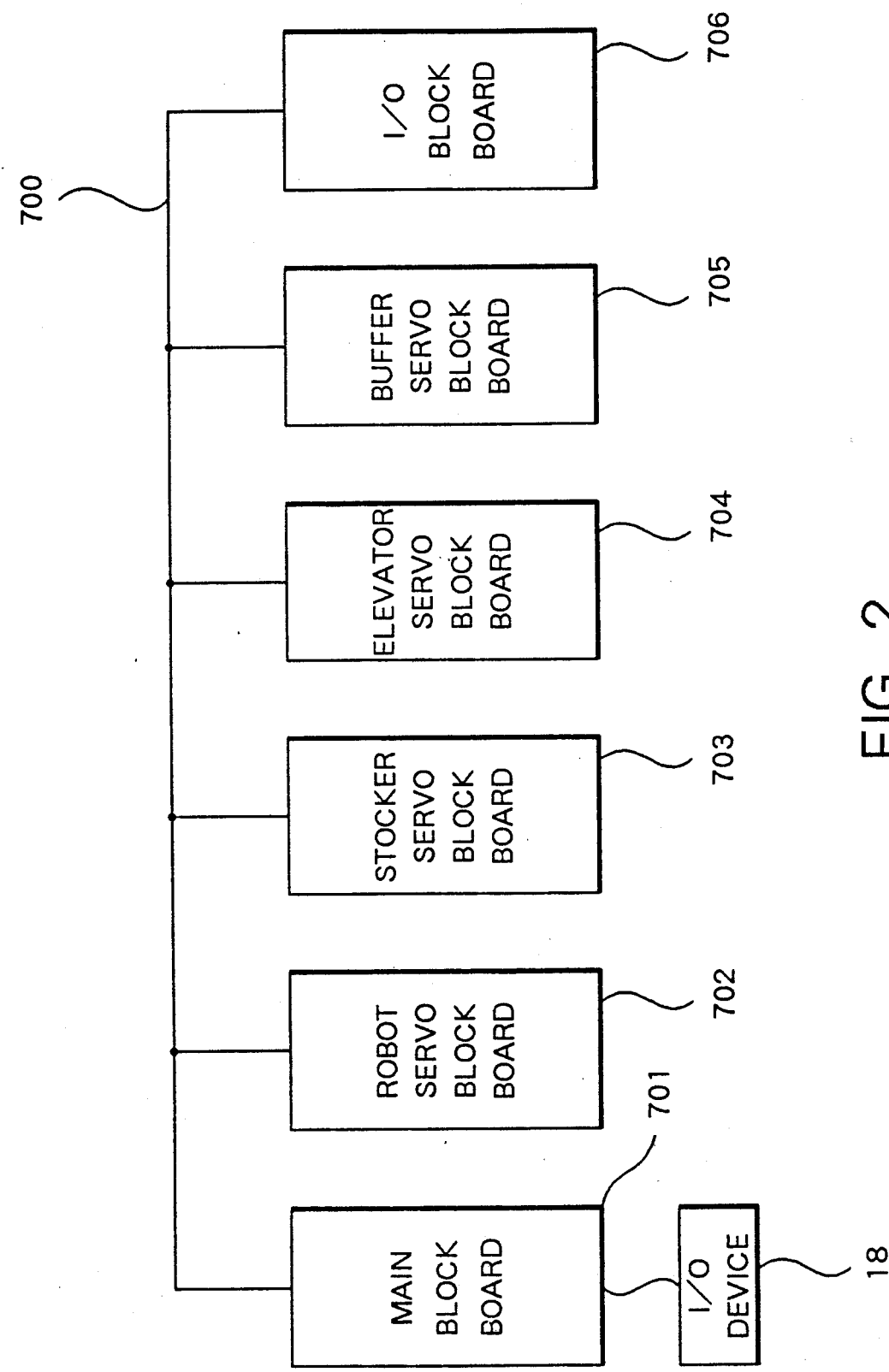
FIG. 2 is a diagram showing a board arrangement in a control unit of the apparatus according to the embodiment shown in FIG. 1.

The controller 16 for controlling function elements to be controlled comprises six microprocessor boards, as shown in FIG. 2. Each microprocessor board incorporates a special-purpose CPU. A robot servo block board 702 is a microprocessor board for a servo block for servo-controlling various servo motors of the robot 12. A board 703 is for the stocker, a board 704 is for the elevator, and a board 705 is for the buffer. An I/O block board 706 is a board for I/O-controlling various sensors and solenoids used in the robot, stocker, elevator, and buffer. The I/O block board is moduled so that the robot, stocker, elevator, and buffer can be controlled by the single board.

The six microprocessor boards are connected to a mother board 700. The controller is constituted by blocks as shown in FIG. 2 since a robot or the like may be added later. In this case, an I/O module for an added robot is added to the I/O block board.

A main block board 701 is a microprocessor board for interpreting a robot language and interfacing with the I/O device 18 under a multitask operating system (to be abbreviated as an MTOS hereinafter). These six microprocessor boards are coupled through a system bus line passing the mother board 700. The system bus 700 can employ a Multibus (available from Intel Corp., U.S.A.), or a Z bus (available from Zilog Inc., U.S.A.) In this embodiment, the Multibus is employed. As for the MTOS, the present inventors referred to, e.g., articles "Guide of Multitask Programming", Interface, June 1987; and "Applications of Interruption and Maltitask Processing", My Computer, Vol. 19, December 1985.

Figure 3:
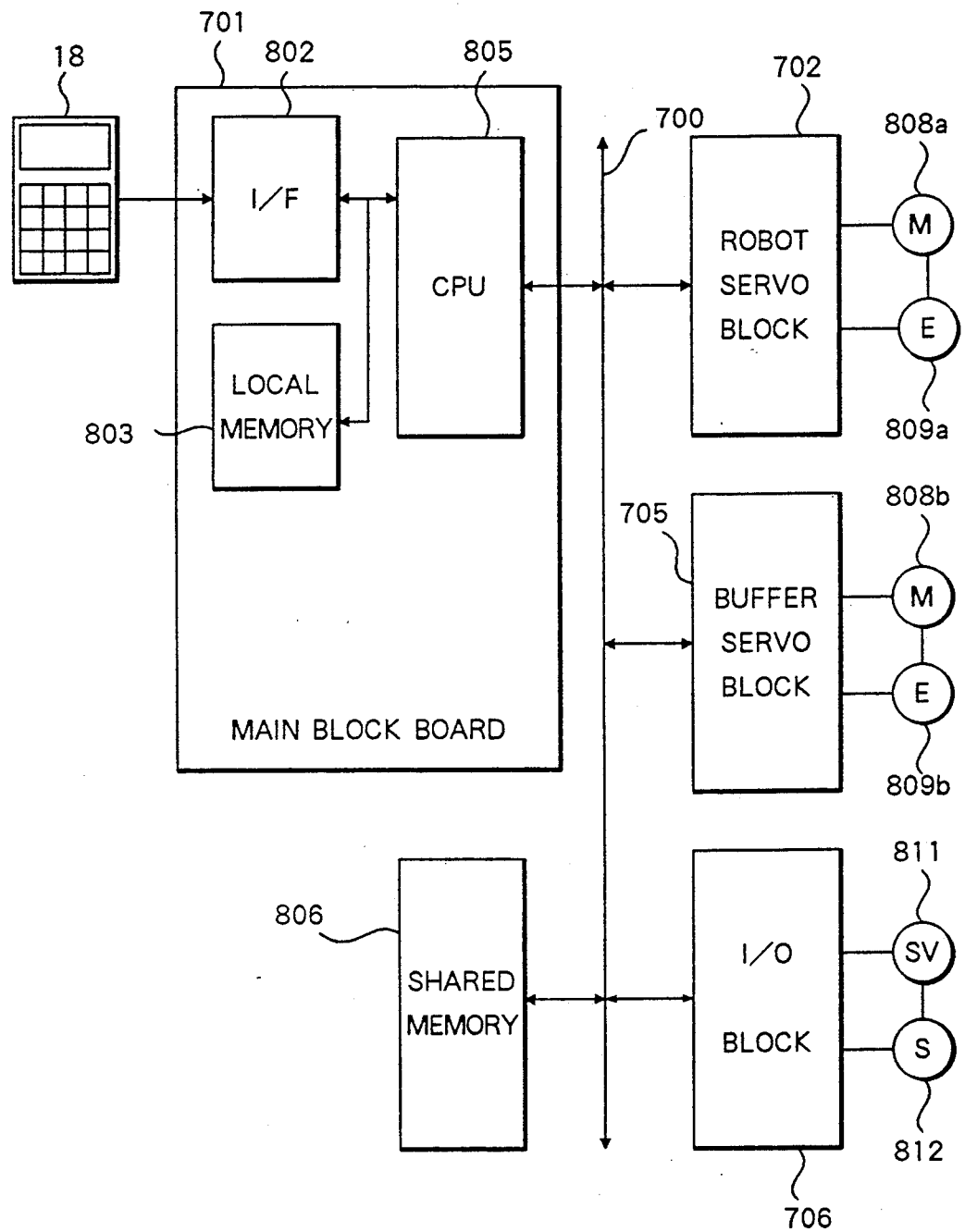
FIG. 3 is a diagram showing connections among an input/output device, a main block, and lower-order control blocks.

FIG. 3 shows the connecting relationship with respect to the main block board 701. Note that the servo block boards for the stocker and elevator are omitted from FIG. 3 for descriptive simplicity. The main block board 701 comprises an RS232C interface (I/F) 802 for communicating with the I/O device 18 according to a predetermined communication rule, a local memory 803 as a main storage of the main block board 701, a CPU 805 for controlling the main block 701, and the like.

Servo blocks 702 to 705 perform operation control of, e.g., motors 808a and 808b and encoders 809a and 809b in accordance with an operation command from the main block board 701. The rotational positions of these motors are detected by the corresponding encoders. The motors and encoders integrally constitute servo motors. In the robot 12, the servo motor is used to drive the finger 220. In the stocker 24, the servo motor is used to vertically move shelves on which a plurality of pallets are placed.

The I/O block board 706 controls a solenoid valve SV 811, a sensor S 812, and the like in accordance with the operation command from the main block board 701. The solenoid valve SV 811 includes one for driving the separating members 66 and 68 shown in FIG. 1.

The main block board 701 controlling each block issues an operation command to the servo block board 702 and the like or the I/O block board 706 through a shared memory 806 on the shared bus (system bus) 700.

The I/O device 18 comprises, e.g., a so-called personal computer. At the I/O device 18, inputting of application programs for the corresponding blocks, inputting of teaching points, and the like are made. The application programs and the like for the corresponding blocks input at the I/O device 18 are stored in predetermined areas of the local memory 803 through the I/F 802.

Figure 4:
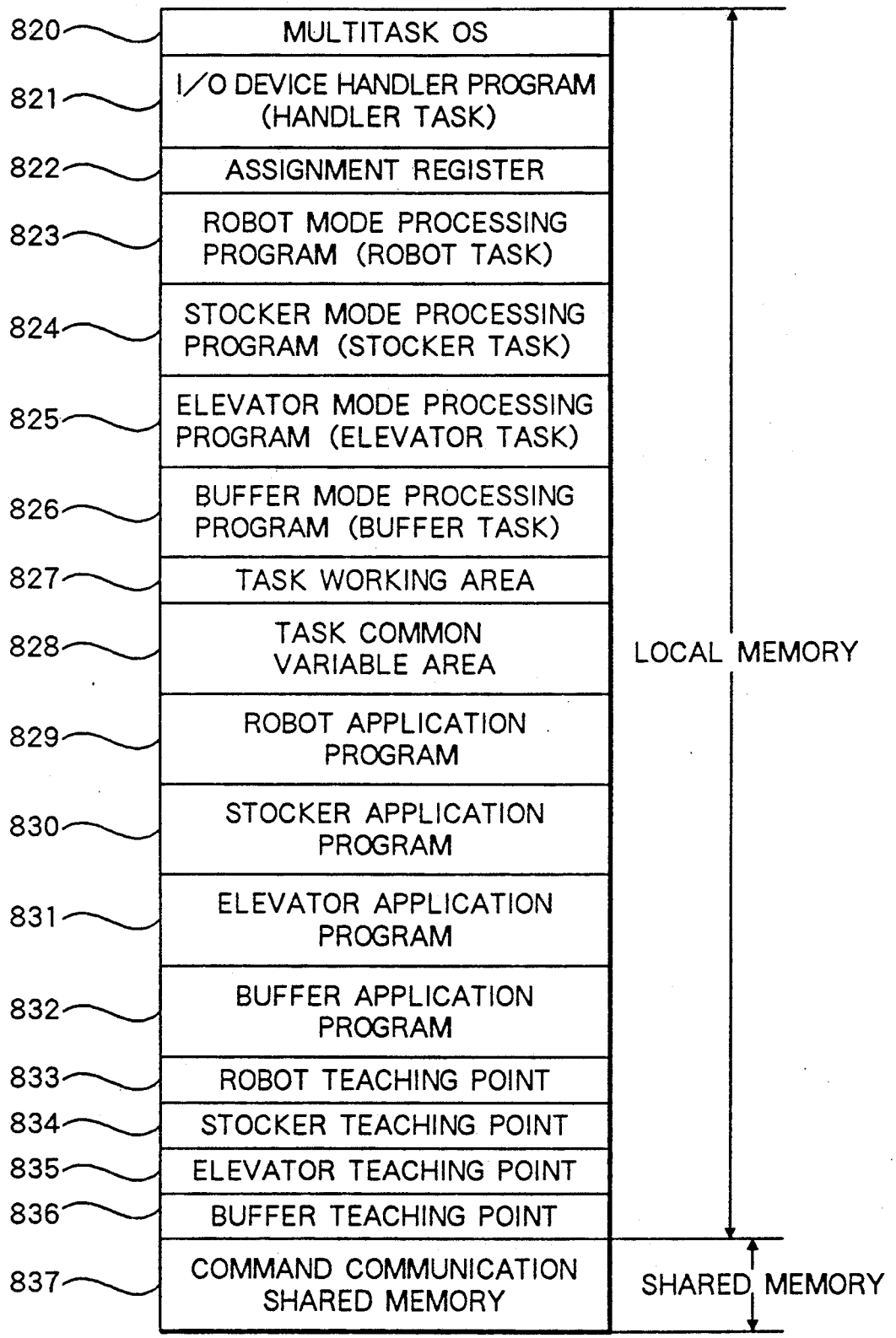
FIG. 4 shows a memory map of a CPU 805 in the main block.

FIG. 4 is a memory map showing a logic address space of the CPU 805 of the main block board 701. In FIG. 4, reference numeral 820 denotes a multitask MTOS; and 821, a handler program (to be abbreviated as an RS handler hereinafter) for performing data handling between the main block and the I/O device 18. Reference numeral 822 denotes an assignment register for storing data indicating a task to which the I/O device 18 is assigned. In a normal assembling apparatus, the I/O device 18 is used only for initializing the whole system. However, when teaching of the robot, stocker, and the like is performed, the I/O device 18 must be individually connected to each of the robot, stocker, and the like. The assignment register is used for managing this connection state.

Reference numerals 823 to 826 denote mode processing programs for processing modes of the robot, stocker, and the like. Seven processing modes (to be described later) are set to each of the robot, stocker, and the like. Reference numeral 827 denotes a work area for each task; and 828, a task common variable area for storing variables commonly used among tasks. Reference numerals 829 to 832 denote areas for storing application programs; and 833 to 836, areas for storing teaching points for numerical control in the robot and the like.

Reference numeral 837 denotes a command communication shared memory which is used by the main block board 701 to perform command communication with the servo block boards and the I/O block board 706. Command communication data is stored in the shared memory 806 shown in FIG. 3. That is, the above-mentioned 820 to 836 are stored in the local memory 803, and the command communication data is stored in the shared memory 806.

Multitask MTOS

FIG. 5 hierarchically shows the programs shown in FIG. 4.

The RS handler task 821, and the robot task 823 to the buffer task 826 are managed under the MTOS 820. The CPU 805 is time-divisionally used by the MTOS 820, the robot task 823 to the buffer task 826, and the RS handler task 821.

The MTOS 820 is an event-drive multitask system. Upon task registration, the MTOS 820 creates a task control box (to be described later), and at that time, initializes a start address of the corresponding task code, a data area (task work area 827) inherent to the task, and a data area (common variable area 828) commonly used by the tasks.

The MTOS comprises system calls (system control command) for flag set/reset, mail (inter-task communication), RS232C interface I/O, the servo block boards, and the like. Execution/stop of a task depends on the set state of an "interruption flag" (to be described later). The interruption flag is provided to each task. For example, when a system call WAIT-FLAG is issued from a given task to another task, if a system call SET-FLAG has already been issued from still another task to the given task, the interruption flag is not set. More specifically, the task is not waited but its execution is continued. If the system call SET-FLAG is not issued from the still another task, the interruption flag of the given task is set, and the right of using the CPU 805 of the given task is abandoned. Thus, the given task is set in a wait state.

More specifically, the CPU 805 can be used by only a task whose interruption flag is not set. If the system call SET-FLAG is issued from another task to the given task while the interruption flag of the given task is set, the interruption flag is reset, and the task in the wait state is switched to an execution enable state.

So-called robot programs in a broad sense written as application programs for the robot, stocker, and the like are subjected to "checking" of a program structure, "interpretation", and "execution" by an interpreter in the MTOS 820. When a variety of system calls are used in an execution routine of each program, data exchange by means of mails among tasks and arbitration of executions of tasks by the flags can be performed. In this manner, a robot language corresponding to multitasks can be provided.

As described above, the CPU 805 is time-divisionally used by the MTOS 820, the robot task 823 to the buffer task 826, and the RS handler task 821. Assume that the robot application program includes control consisting of the step of rotating the finger 220 of the robot 12 through a predetermined angle and the step of stopping movement of the stocker 24 until the rotation is completed. When the robot task can use the CPU 805, the step of rotating the finger is interpreted and executed by the robot task (in practice, the CPU 805). This step is executed by sending a predetermined I/O command (to be described later) to the robot servo block 702. More specifically, the servo block 702 receives only a rotational angle, and causes the servo motor to perform the rotation. After the robot task 823 sends the I/O command to the robot servo block 701, it executes the step of stopping the movement of the stocker 24. The execution of this step is realized by setting the "interruption flag" of the stocker task.

In this manner, the task operations are controlled by the MTOS, and executions of corresponding I/O operations are realized by the servo blocks or the I/O block. This point is the major characteristic feature of the present invention. Sharing of the I/O device 18 by the function block boards is another major characteristic feature of the present invention. These features will be described later in more detail with reference to control to be described later.

The task common variables 828 (FIG. 4) include, e.g., a variable G indicating the assembling process, a variable S [G] indicating a shelf position in the stocker 24 on which a pallet storing parts used in the process G is stocked, a variable Z [G] indicating the number of remaining parts in the pallet used in the process G, a flag I [G] indicating that an empty pallet in the stocker 24 is to be replaced, and the like. The flag I [G] is set when the remaining parts count Z [G] of the pallet for the process G becomes "0", and indicates that the pallet having Z="0" is to be replaced so as to supply a new pallet from the buffer 22 through the elevator 26. Note that the these common variables are described in detail in the specification of Patent Application "Article Feeding Apparatus" filed simultaneously with the present application.

A work area used in each task is inherent to the task and is closed. In this embodiment, however, the common variable area 828 commonly used by the tasks is provided, so that these variables can be accessed from any task. In this manner, the task common variable area is constituted in an area common to the tasks as a portion of a robot language as a descriptive language of the application program, so that a numerical value or program code can be operated from any task. Synchronization among tasks is realized by the task common variables and the robot language corresponding to multitasks characterized by issuing a system call for the MTOS.

Since data exchange among tasks is performed through a memory, parallel execution of the function block boards on the application program level does not require a complicated wiring and a complex communication program, resulting in high-speed control. In addition, as will be described later, it should be noted that dependency of operations (difference in operations) of the robot, stocker, and the like is absorbed by a difference in tasks under the multitasks.

I/O Path

Figure 6:
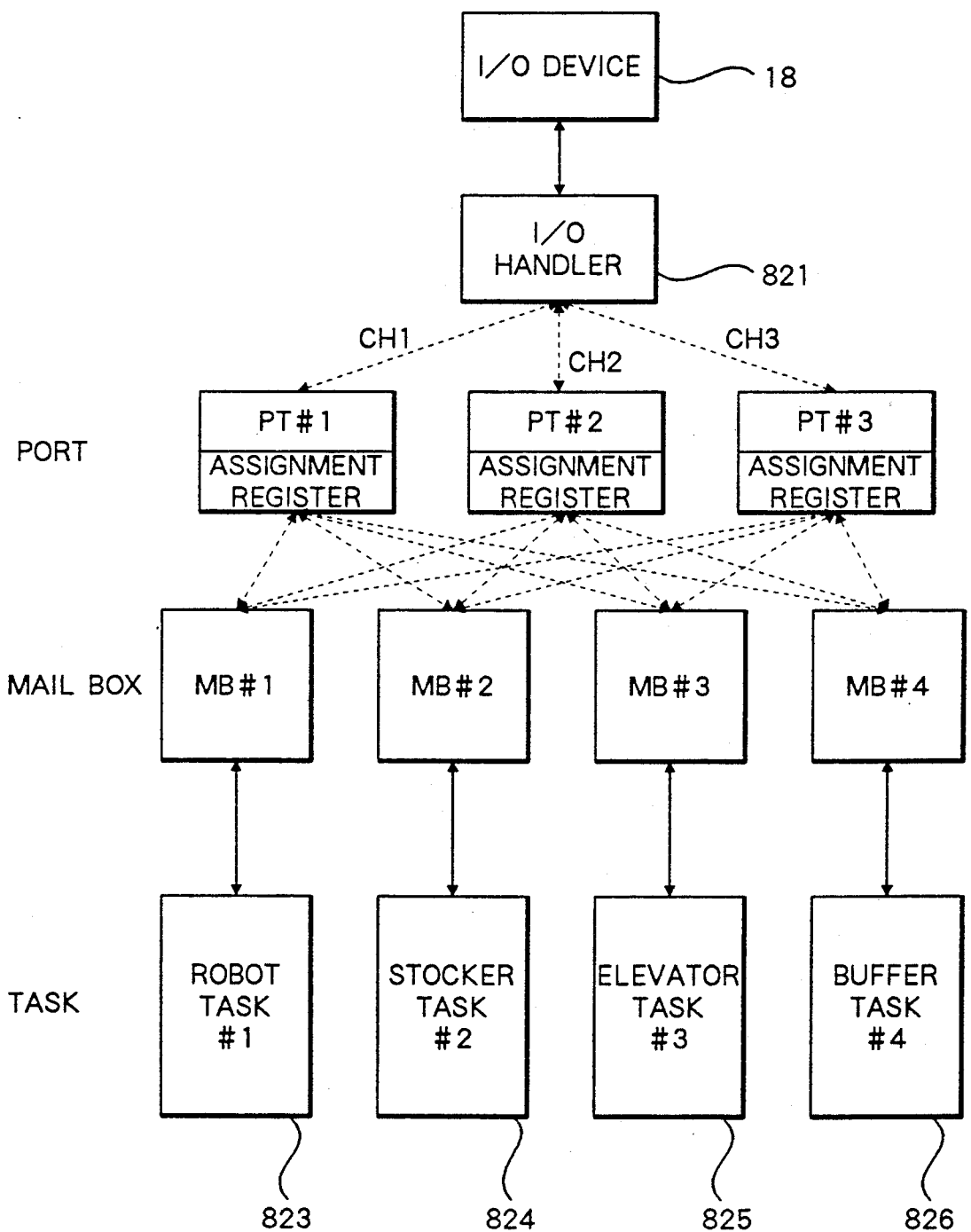
FIG. 6 is a diagram showing connections of data logic paths among blocks.

FIG. 6 shows a logic data path provided between the RS handler 821 and respective tasks. Three I/O ports ($PT_1$ to $PT_3$) are prepared for the RS handler 821. The port has a one-to-one correspondence with an I/O channel path. As has been described above, special-purpose mail boxes ($MB_1$ to $MB_4$) for performing data exchange with the I/O device 18 are prepared for the four tasks 823 to 826. Since the number of I/O ports of the RS handler 821 is 3 and the number of mail boxes is 4, data for holding the task (or mail box) to which each I/O port is assigned is necessary. This data is one stored in the assignment register 822. The assignment data is stored in the area 822 of the local memory 803, as has been described above, and one word of data is prepared for each port (i.e., each channel).

FIG. 7 shows a format of the assignment register. As described above, this assignment register is prepared for each port/channel. If the value of the register is "0", this means that the corresponding port/channel is in an open state. When the value of the register is "1", this means that the corresponding port/channel is occupied by the robot task 823; when "2", that it is occupied by the stocker task 824; when "3", that it is occupied by the elevator task 825; and when "4", that it is occupied by the buffer task 826. In order to reset (open) the bit of the assignment register, a "D0" command is input from the I/O device 18 to the main block 701. When a given port is assigned to the robot task 823, a "D1" command is sent from the I/O device 18 to the main block 701.

Task Control Box

The task control box is provided to manage starting, execution, and the like of each task under the MTOS 820. FIG. 8 shows a format of the task control box. The task control box is created during initialization. Tasks which can be registered in the task control box and are especially associated with this embodiment are the RS handler task 821, the robot task 823, the stocker task 824, the elevator task 825, the buffer task 826, and a start-up task which is started by the MTOS 820 and cannot be used by a user, as shown in FIG. 8. The start-up task is not shown in FIG. 4 because of its specific nature.

Data stored in the task control box will be described below. That is, the task control box stores a "start address" indicating an address of a start instruction of the task, a "registration flag" indicating whether or not the task is registered in the system, a "start flag" indicating whether or not the task is started, an "interruption flag" indicating that the task is being interrupted although it was started, an "assignment flag" indicating whether or not the task is assigned to the RS handler, a "mail box flag" indicating that data is input to the corresponding mail box, and the like. The "interruption flag" is set by the system call WAIT-FLAG and is also set simultaneously with setting of "mail box input wait flag", "I/O completion wait flag", "assignment wait flag", and the like. The "mail box input wait flag" indicates that the task waits for inputting of data therefor into the mail box. The "I/O completion wait flag" indicates that the task waits for interruption indicating completion of the I/O command from the servo board. The "assignment wait flag" indicates that the task waits for assignment to any channel by the RS handler.

Inter-task scheduling and switching is managed according to so-called round robin scheduling. More specifically, the "interruption flags" of all the registered and started tasks are sequentially searched. The application program of the task having the "interruption flag"="0" is then executed. The application program of the task having the "interruption flag"="1" is not executed, and the "interruption flag" of the next task is searched.

Note that the "mail box flag" is set by the MTOS 820.

The task control box of the RS handler task of this embodiment corresponds to three channels (CH1 to CH3). Channels which are sufficient to cope with all the tasks may be prepared. However, all the tasks are rarely simultaneously set in a communication state with the RS handler in this automatic assembling/feeding apparatus. Therefore, the number of channels is reduced in order to prevent the program size and system from being complicated. Therefore, if the scale of the automatic assembling/feeding apparatus of this embodiment is complicated, the number of channels must be accordingly increased. In this case, the channels can be extended without changing the algorithm of the system, as will be understood from the following description.

In the control program to be described below, a description will be made assuming that a port/channel corresponds to one channel.

Control Between I/O Device—Task

Control modes of tasks in the automatic assembling-/feeding apparatus of this embodiment include the following seven modes:

a mode of interpreting a robot program and instructing operations to respective blocks (automatic mode);

a mode of creating and storing the robot program (program mode);

a mode of monitoring inputs from the I/O device 18 or sensors (input mode);

a mode of opening/closing an output (output mode);

a mode of teaching an operation position to the robot (teaching mode);

a mode of receiving and storing an operation position of the robot (data mode); and a mode of updating parameters for the operations of the blocks (parameter mode).

An instruction for accessing these modes is made from the I/O device 18. More specifically, a given task is operated in accordance with a program of this task, because the given task is started by the I/O device 18. For this purpose, the given task must be assigned through any port/channel to the I/O device 18.

Figure 9:
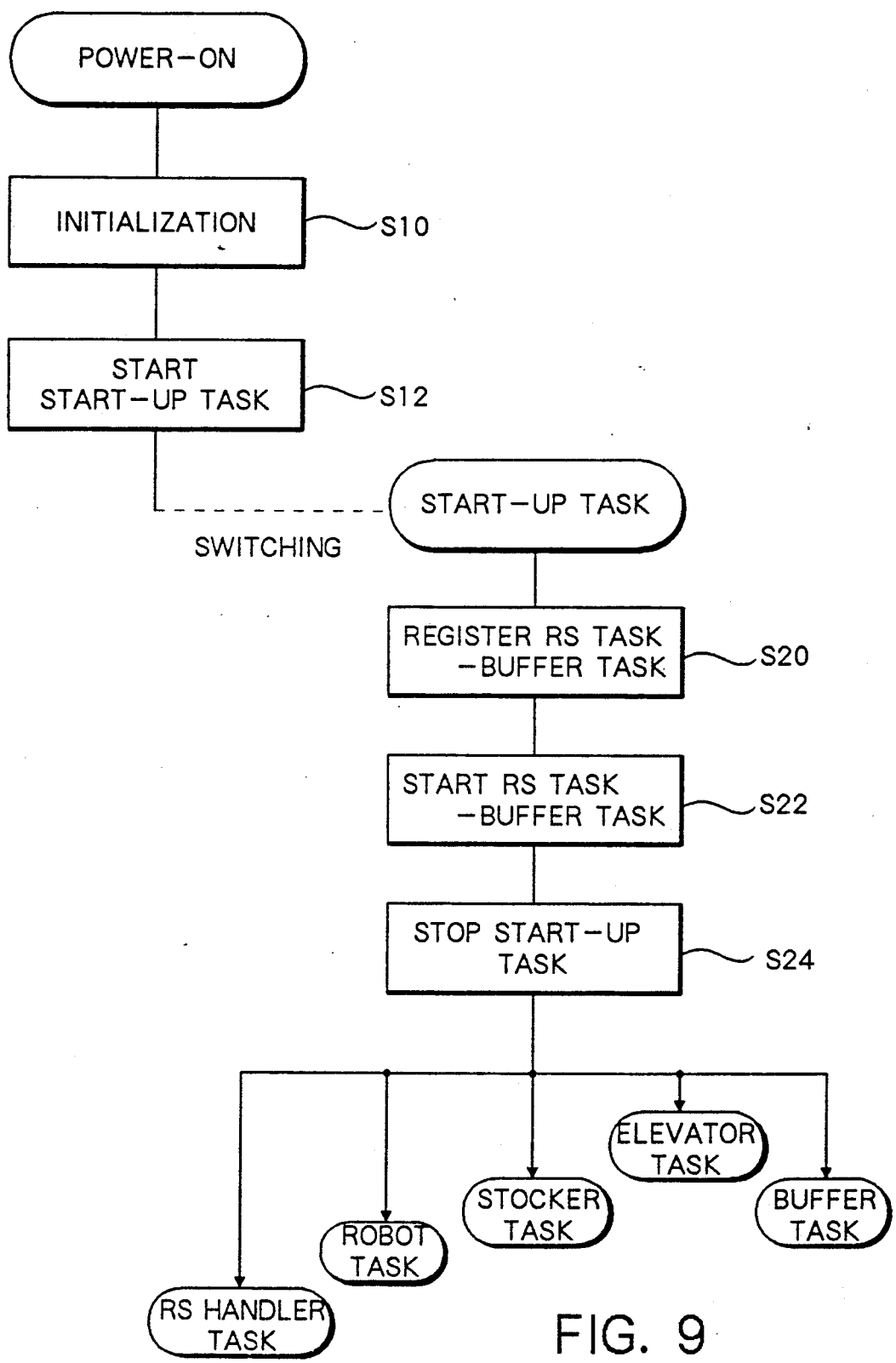
FIG. 9 and FIGS. 10 through 10C are flow charts of an operation control program for sharing an input/output device 18 by the tasks.
Figure 10A:
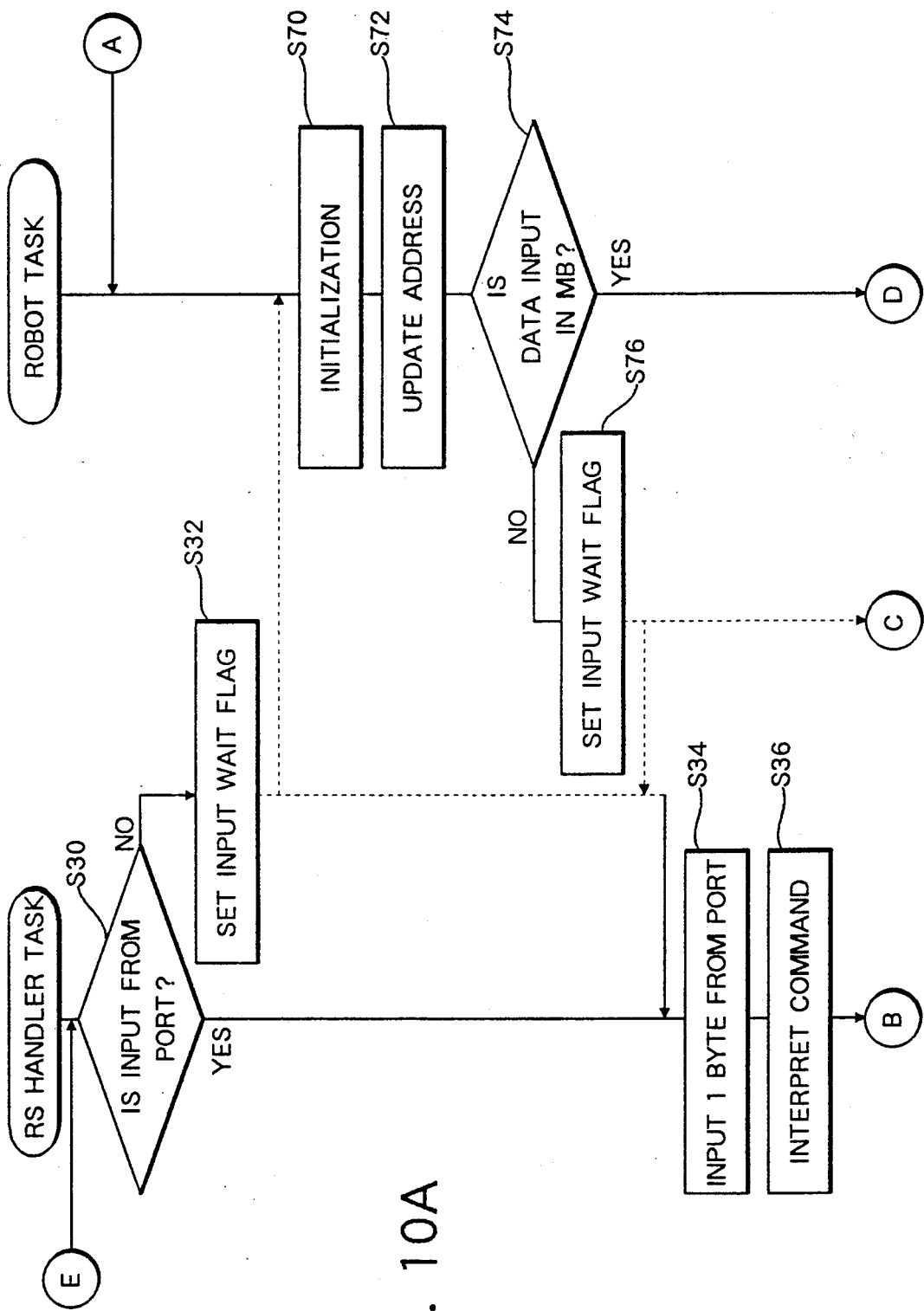
Figure 10B:
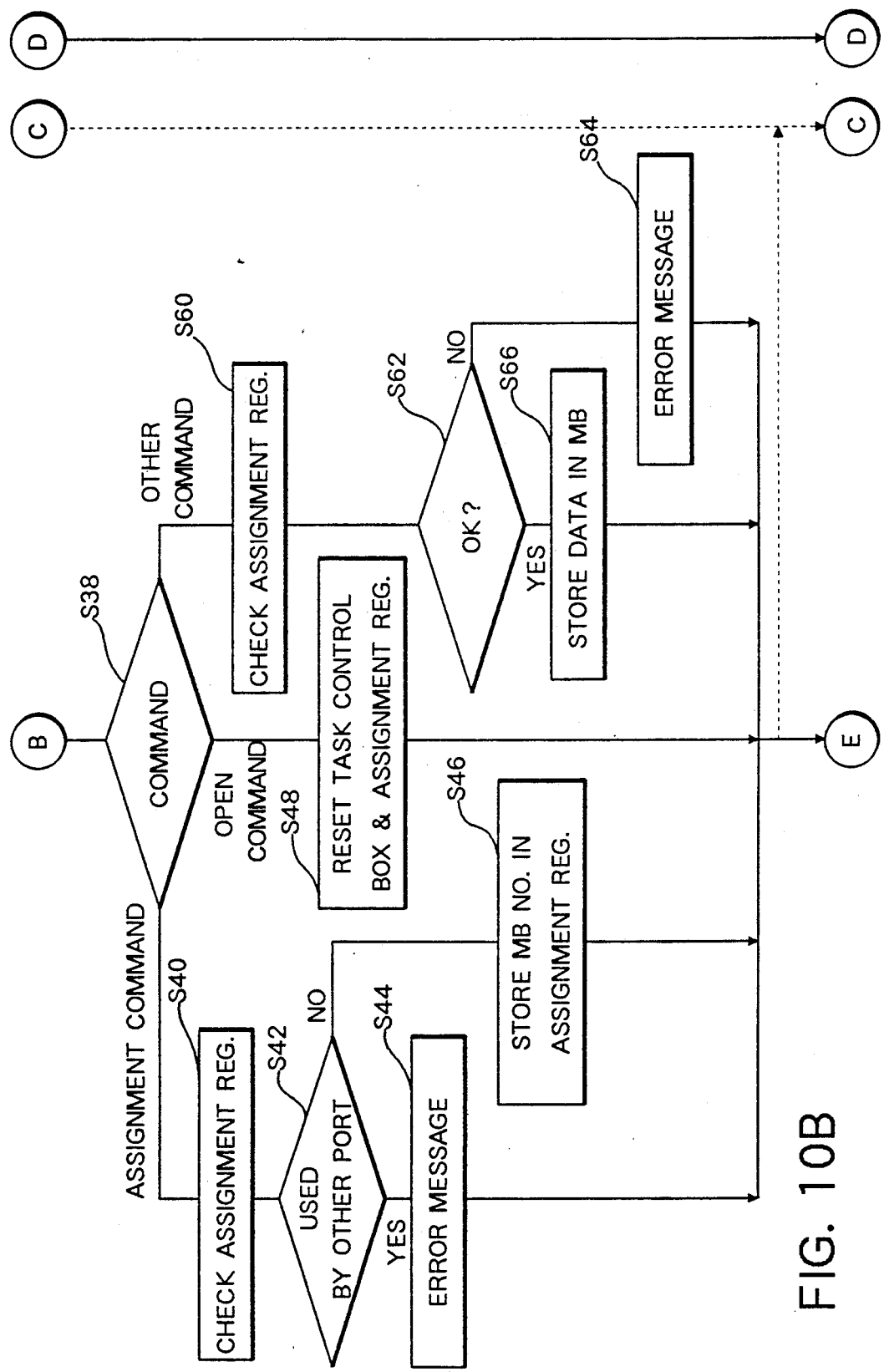
Figure 10C:
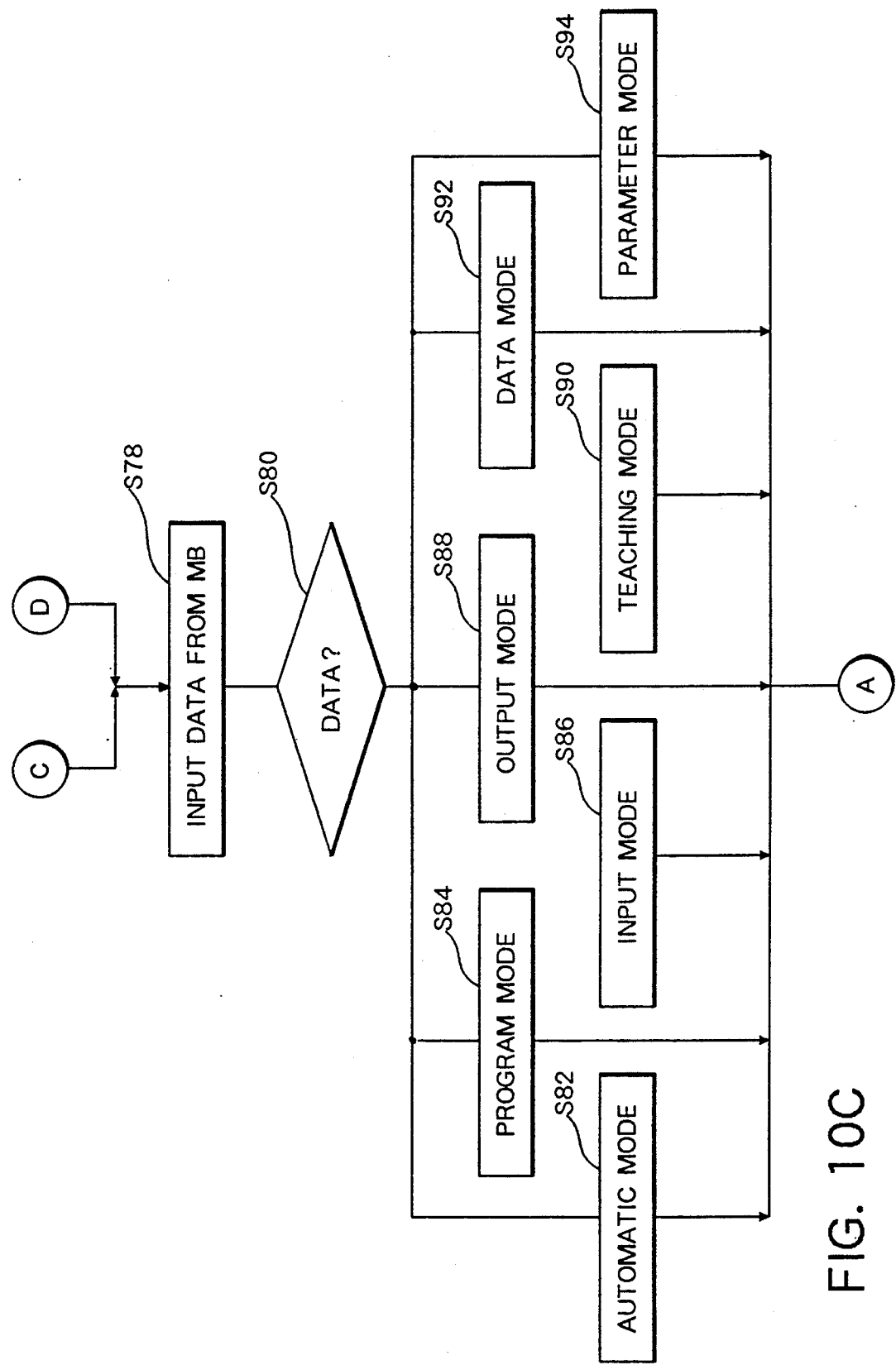

FIGS. 9 and FIGS. 10A through 10C are flow charts of a control program associated with assignment. FIG. 9 shows control until each task is started by the MTOS 820, and FIGS. 10A through 10C show control until a task is assigned to the RS handler 821. Note that FIGS. 10A through 10C show only a program used when the robot task 823 is assigned to the RS handler 821 for the purpose of descriptive convenience.

When the controller 16 is powered, the task control box, working area, and the like of the main block 701 described above are initialized in step S10. The MTOS 820 starts a start-up task. More specifically, the "registration flag" and "start flag" for the start-up task of the task control box (FIG. 8) are set to be "1". The MTOS 820 performs task scheduling in accordance with the above-mentioned round robin scheduling.

In steps S20 and S22 in the start-up task, the "registration flags" and "start flags" of the RS handler task, the robot task, the stocker task, the elevator task, the buffer task, and the like corresponding to channels CH1 to CH3 are set to be "1". In step S24, the "start flag" of the start-up task itself is set to be "0", and the "interruption flag" is set to be "1", thus halting the start-up task.

Thereafter, as described above, task scheduling and switching from the RS handler task to the buffer task are performed in accordance with the round robin scheduling.

Control performed until the RS handler 821 is assigned to the robot task 823 will be explained below with reference to FIGS. 10A through 10C. In the RS handler, the "start flag" is set to be "1" by the start-up task (step S22). In step S30, an input from the I/O device 18 through the RS232C interface 402 is checked. If NO in step S30, the "interruption flag" and the "input wait flag" are set to be "1" in step S32, thus abandoning the right of using the CPU 805.

If the RS handler task 821 is interrupted, the robot task is switched by the task scheduling. Since the registration flag and the start flag of the robot task 823 have already been set by the start-up task (step S22), control is executed from step S70, and variables and the like used in the above-mentioned modes are initialized. In step S72, the start address of the task control box is updated. This is not to perform initialization in step S70 when the RS handler task is again switched to the robot task 823. Therefore, the start address to be updated indicates step S74. It is checked in step S74 if the mail box (FIG. 6) for the robot task stores the input from the handler 821. If NO in step S74, the "interruption flag" and the "input wait flag" of the robot task 823 are set to be "1", and control is switched to another task (in the case of this flow chart of FIGS. 10A through 10C, to the RS handler task). However, if YES in step S74, the flow advances to step S78.

Assuming that no input has been made from the RS handler yet, since the "mail box flag" of the robot task 823 is left reset, control is switched to execution of the RS handler task 821.

The RS handler task is interrupted since it waits for inputs from the I/O device 18 through a port in step S32. When the robot task is switched to the handler task, the handler task is restarted, and if an input from the I/O device 18 is made through the interface 402, the "interruption flag" and the "input wait flag" are reset by the MTOS 820. In the handler task, the flow advances from step S30 to step S34, and one byte is input from the port. In step S36, the input command is interpreted. In accordance with the command interpretation result, the flow advances to one of steps S40, S48, and S60.

The command includes an assignment command for assigning a port to a task, an open command for opening the assigned port, and other commands.

Step S40 and the subsequent steps correspond to control when the input command is the assignment command. The assignment command is input to assign a port/channel, to which this command is input, to a task indicated by this comannd. More specifically, the command is input to assign the designated task to the I/O device 18. Thus, the I/O device 18 performs communication with the task through the assigned channel. If the command is input to assign the port/channel to the robot task 823, the command is "D1" as described above. Thus, the assignment registers of ports/channels other than the one to which this command is input are checked in step S40. This is to check if another port/channel has already been linked to the robot task. If the robot task has already been linked to another port, an error message is sent back to the RS handler task 821 because two or more logic paths are inhibited from being provided to one task. If the input from the RS handler task and the output thereto are allowed to be separately performed, steps S42 and S44 can be omitted.

If NO in step S42, a mail box number (FIG. 6) of the task to be assigned is stored in the assignment register (FIG. 7) in step S46. For example, if a port of CH1 is assigned to the robot task 823, "1" is stored in the assignment register of CH1. In this manner, the RS handler task 821, the port/channel, and the specific task are linked through the mail box.

After the RS handler task 821 sets the above-mentioned logic path, the flow returns to step S30, and the task 821 waits for another input from the port/channel.

If no input is made from the I/O device 18 in step S30 and control is switched to the robot task 823, the robot task 823 is waiting for mail box data in step S76. Therefore, control is again switched to the RS handler task 821. If the input from the I/O device 18 is detected in step S30, the flow advances to step S34→step S36→step S38.

If the input is neither the assignment command nor the assignment open command, the flow advances to step S60. In step S60, the assignment register is checked to check if the port/channel to which this command is input has already been linked with the task designated by the command. If NO in step S62, an error message is sent back to the RS handler task 821 through the corresponding port/channel in step S64. If YES in step S62, the input command is stored in a mail box of a number indicated by the assignment register, and the flow returns to step S30. In this case, the MTOS sets the "mail box flag" of the corresponding task to be "1", and resets the "interruption flag".

If the command input to this mail box is for the robot, control is switched to the robot task 823. Since the "mail box flag" is set, the robot task 823 fetches data in the corresponding mail box in step S78. The robot task is transited to any one of the above-mentioned seven modes in accordance with the fetched command.

In this manner, exchange of various commands from the I/O device 18 is made while one port/channel is logically linked with the task.

Note that the robot task 823 escapes from each mode in response to an input of a mode escape command, and the flow returns to step S70.

A case will be described hereinafter wherein the assignment open command is input from the I/O device 18. In this case, the flow advances to step S30→step S34→step S36→step S38→step S48. In step S48, the corresponding channel of the assignment register is set to be "0", and an assignment status bit of the task control box is set to be "0".

The assignment open command is necessary since three ports/channels are provided while four tasks using these ports/channels are provided. Opening of assignment can be scheduled by the program in the I/O device 18 in accordance with the round robin scheduling.

Figure 11:
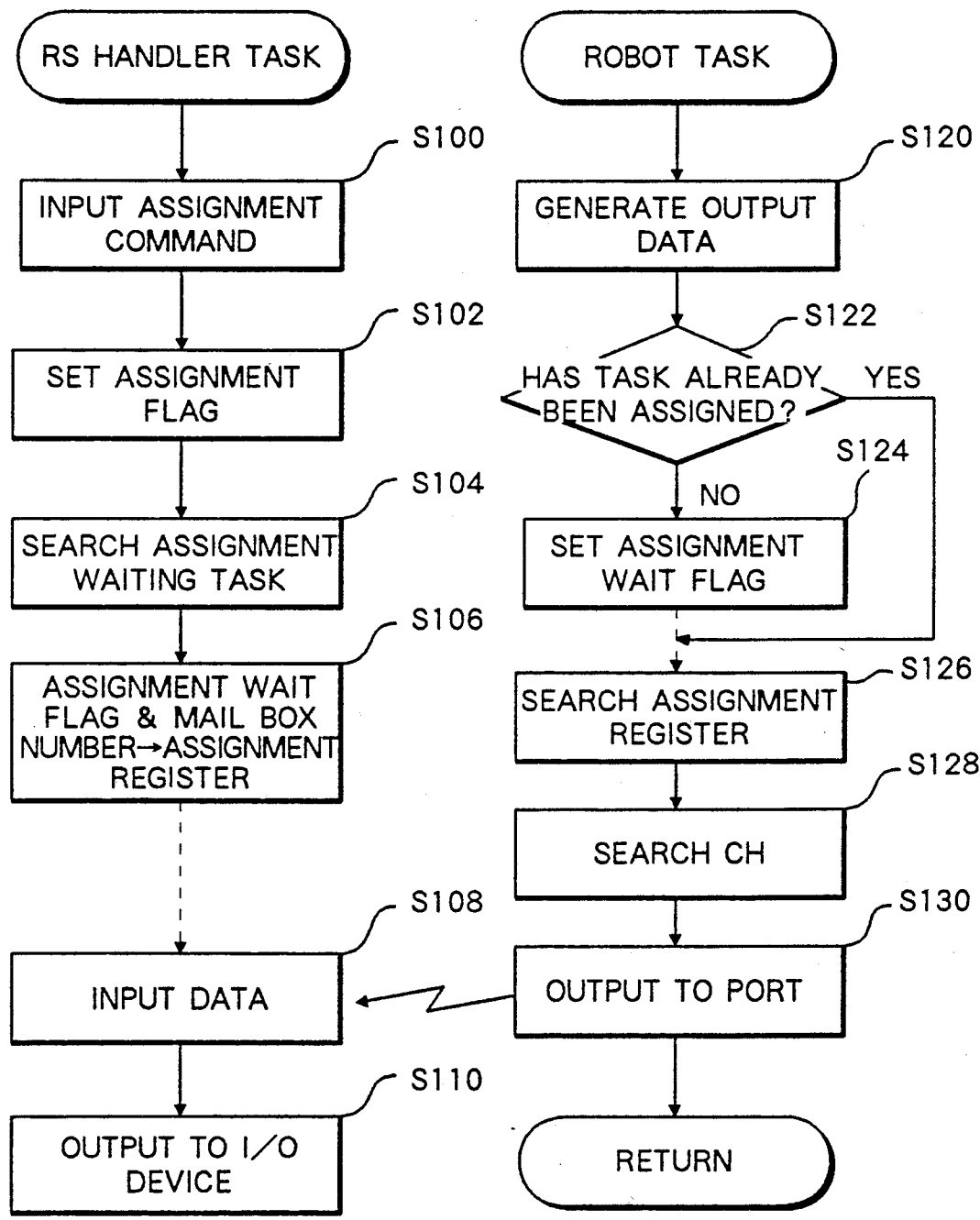
FIG. 11 is a flow chart of data output control from a task to an RS handler task.

Control when data is output from each task to the I/O device 18 through the RS handler task 821 will be described hereinafter with reference to FIG. 11. In this case, the task will be described using only the robot task 823 for the sake of descriptive simplicity as in FIGS. 10A through 10C.

Assume that output data to the I/O device 18 is generated in step S120 during execution of the application program of the robot task 823. In this case, the robot task checks the set state of the self assignment flag of the task in the task control box by means of the system call in step S122. If NO in step S122, the robot task waits for assignment by the assignment command from the I/O device 18. More specifically, the "assignment wait flag" and the "interruption flag" for the robot task in the task control box are set to be "1".

Steps S100 and S102 of the RS handler task 821 correspond to steps S30 to S46 in FIGS. 10A through 10C. More specifically, one of the three ports/channels is assigned to one of the tasks in steps S100 to S102 in accordance with the above-mentioned algorithm in response to the command from the I/O device 18.

If the assigned task is the robot task (task number = 1), the assignment state flag of the robot task is set to be "1" in step S46, and the task which waits for assignment is searched in step S104, as described above. Since the assignment wait flag of the robot task is set in step S124, the MTOS resets the "assignment wait flag" and the "interruption flag" of the robot task to be "0" and stores the mail box number (= 1) of the robot task in the assignment register of the corresponding channel, in step S106. At this time, control is switched to the robot task 823.

Control of the robot task 823 is resumed from step S126. In step S126, the contents of the assignment registers are sequentially checked to search for a channel coinciding with the mail box number (= 1) used by the self task. In step S130, data is directly output to the I/O device 18 through the searched port/channel.

In this manner, whenever output data is generated from an arbitrary task to the RS handler task 821, the data is output after the logic path is guaranteed, and the output data will not be lost.

As described above, one port/channel is connected to one task by the assignment command, and is opened by the assignment open command. This means that one I/O device 18 can be shared by a plurality of tasks. As has been described in the prior art, in the automatic assembling/feeding apparatus of program control, various control operations such as teaching of teaching points, initialization of the system, and the like are necessary. When the robot, stocker, and the like are independently operated like in this embodiment, teaching must be performed in units of blocks. According to the prior art, a plurality of I/O devices for teaching are necessary. However, in this embodiment, at least one I/O device 18 need only be arranged. Thus, one I/O device 18 is shared among respective function blocks in the automatic assembling apparatus such as the robot, stocker, and the like. In addition, when a robot or the like is extended, although a new control block board (FIG. 2) for this robot is necessary, a teaching machine for teaching need not be added. When data is input to each load, conveniently an operator need not be moved to an I/O device 18 corresponding to the load.

Control Between Main Block—Servo Block

Among the tasks, as described above, control modules are synchronously operated by flag management by the system call and management using common variables by the MTOS 820. These tasks are connected to the servo block boards (702 to 705) and the I/O block board 706 through the system bus 700 via physical level control of the MTOS. Prior to a description of the interface between these servo blocks and the main block including the tasks, "monitoring" of each module control in the automatic mode will be described below with reference to FIG. 12. In this monitoring, as the application programs are executed, lines of steps of the program are displayed on the I/O device 18 to indicate the execution state.

Figure 12:
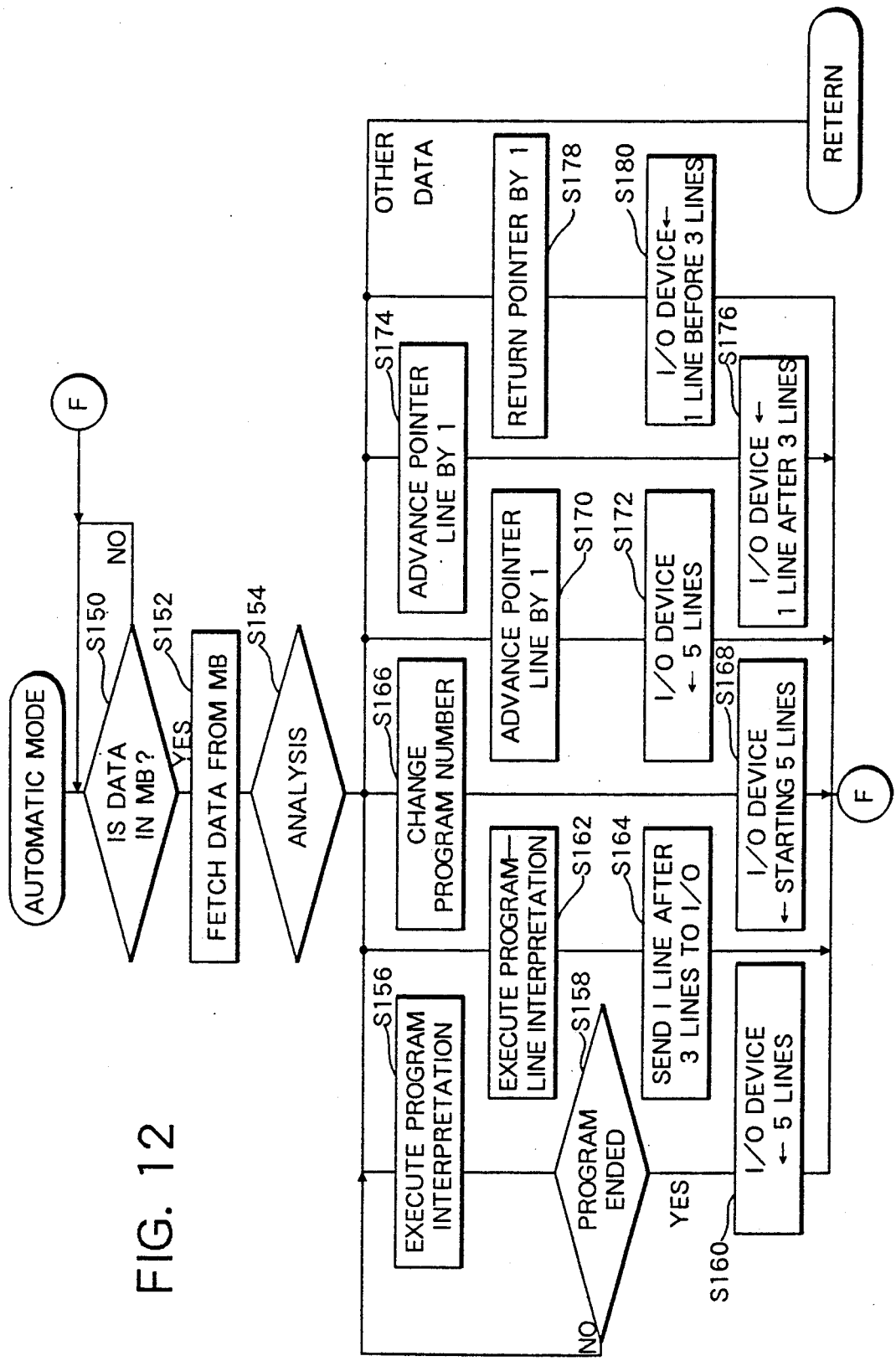
FIGS. 12 and 14 are flow charts of a program associated with control of the embodiment.

In FIG. 12, it is checked in step S150 if data is input to the mail box of a task which calls the automatic mode. If NO in step S150, control is switched to another task, and data input is waited. If YES in step S150, the input data is fetched in step S152, and is analyzed in step S154 to discriminate an operation instruction. In this embodiment, six display operation instructions are prepared. A first instruction is an interpretation/execution instruction of the program in step S156. In this case, the program is executed to its end, and when it is ended, data corresponding to five lines of the program with respect to the ended pointer line is output to the I/O device 18. A second instruction is, e.g., an interpretation/execution instruction of one line of the program in step S162. In this case, interpretation/execution is made in units of lines of the program. In step S164, data corresponding to one line of the program after three lines from the pointer line advanced by one line is output to the I/O device 18. A third instruction is, e.g., an instruction of updating a program number in step S166. In this case, data corresponding to the starting five lines of a program indicated by an updated program number is sent to the I/O device 18. A fourth instruction is, e.g., an instruction of updating a pointer line in step S170. In this case, data corresponding to five lines of the program with respect to the updated pointer line is output in step S172. A fifth instruction is an instruction of advancing the pointer line in step S174. In this case, data corresponding to one line after three lines from the updated pointer line is output in step S176. A sixth instruction is, e.g., an instruction of returning a pointer line by one line in step S178. In this case, data corresponding to one line before three lines from the updated pointer line is output in step S180. Note that these data are output under the control shown in FIG. 11 described above.

An interface between the main block board 701 and the servo block boards 702 to 706 will be described hereinafter with reference to FIGS. 13 and 14. As can be seen from the above description, the MTOS and various tasks run on the main block board. The servo motor, solenoid, and the like as elements to be driven are simply driven by the servo blocks, I/O block, and the like. In this sense, in this specification, the main block 701 is positioned as a host control block, and the servo blocks and the like are positioned as lower-order blocks of the main block. Thus, the interface between the host control block and the lower-order control blocks will be described below.

FIG. 13 shows a format of data used in communication between the host control block and lower-order boards. The communication data consists of a "number of transfer bytes" field, an "operation instruction code" field, and a "parameter" field, and is stored in an area 837 (FIG. 4) of the shared memory 806. The "operation instruction code" is a command or the like for instructing to move the robot arm upon rotation of the servo motor, and has a length of one byte. A moving position of the servo motor is set in the "parameter" in this case. The "number of transfer bytes" is a total number of bytes of the instruction code and the parameter. The number of transfer bytes is necessary since the "parameter" has a variable length. As shown in FIG. 13, the servo block 702 for the robot 12 keeps a communication area which is sufficient enough to drive a maximum of 256 (=100 H) devices such as servo motors.

Control of the interface between the host control block and the lower-order control block will be described with reference to FIG. 14. When an application program (present in the host control block) of a given task executes a command such as "MOVE" for the servo motor, an interpreter interprets this command, and generates a system call to the MTOS 820. The MTOS 820 prepares for the "operation instruction code" and "parameter" corresponding to this command, and transfers them to the task which is executing this application program. The task stores these "code" and "parameter" at a predetermined location in the shared memory 806 in step S200. In step S202, the main block performs interruption to the corresponding lower-order board (e.g., the servo block board of the robot) through the system bus 700. In step S204, the system call is generated, and the "I/O completion wait flag" and "interruption flag" of the task control box are set to be "1". Thus, control enters in the wait state.

The lower-order block which accepts interruption in step S212 fetches the "operation instruction code" and "parameter" from the shared memory 806 in step S214, and executes the corresponding operation in step S216. In step S220, the lower-order block performs interruption of operation completion to the main block 701 (=host block). In response to the interruption, the MTOS 820 of the main block resets the "completion flag" and "interruption flag" in the task control box as a cause of the I/O completion interruption to be "0". In this manner, the corresponding task is set again in an execution possible state.

Note that the I/O block also keeps the same areas shown in FIG. 13 in the shared memory 806. For example, when a command for biasing a given solenoid is executed in the robot task 823, the interpreter interprets that an element to be driven is the solenoid and control therefor should be made in the I/O block 706, prepares the "operation instruction code" and the like shown in FIG. 13 in the shared memory 806, and generates a system call to the MTOS 820. Thus, the MTOS 820 performs an interruption of the I/O block. Other operations are the same as those in the case of the servo block described above. The same I/O block is used for a solenoid and the like of the stocker, elevator, buffer, and the like.

As described above, this main block (=host control block) and the lower-order control blocks are interfaced by a simplified command set as shown in FIG. 13. In addition, the operations of the devices such as servo motors in each lower-order block can be described as an extremely simplified command. This leads to the following important features. That is, the robot, stocker, and the like respectively have independent functions, and their operations are different from each other. If these operations are controlled by different controllers corresponding to the different functions using the corresponding control programs like in the conventional apparatus, each time a function is added, a different controller must be added. In this embodiment, however, if the robot and the stocker have different functions, this difference corresponds only to a difference of control algorithms, and the difference of algorithms is absorbed in a difference of tasks. The difference of tasks is merely a difference of programs. The robot and stocker are merely groups of devices such as servo motors, solenoids, and the like if the difference of the algorithms is abstracted. Since the operations of these devices can be expressed by simple commands, the lower-order boards of, e.g., the robot and stocker have almost no difference. Since the main block serving as the host control board is not affected by the independency of devices to be driven such as servo motors, it only has different programs, and this leads to only a difference of memory capacities. More specifically, in the main block, functions can be extended by only increasing the memory capacity. In addition, in the lower-order control blocks, even if the number of functions is increased, since an identical control board can be used, this results in considerable cost reduction.

Modification

In the above embodiment, the I/O device 18 has three ports but it may have one or four or more. The number of I/O devices is not limited to one. When there are 10 objects to be controlled, two or more I/O devices 18 can be installed in view of efficiency.

In this embodiment, an object to be controlled is one block, which corresponds to one task and one board. If one board has a space margin, a plurality of control blocks can be mounted on one board.

Figure 14:
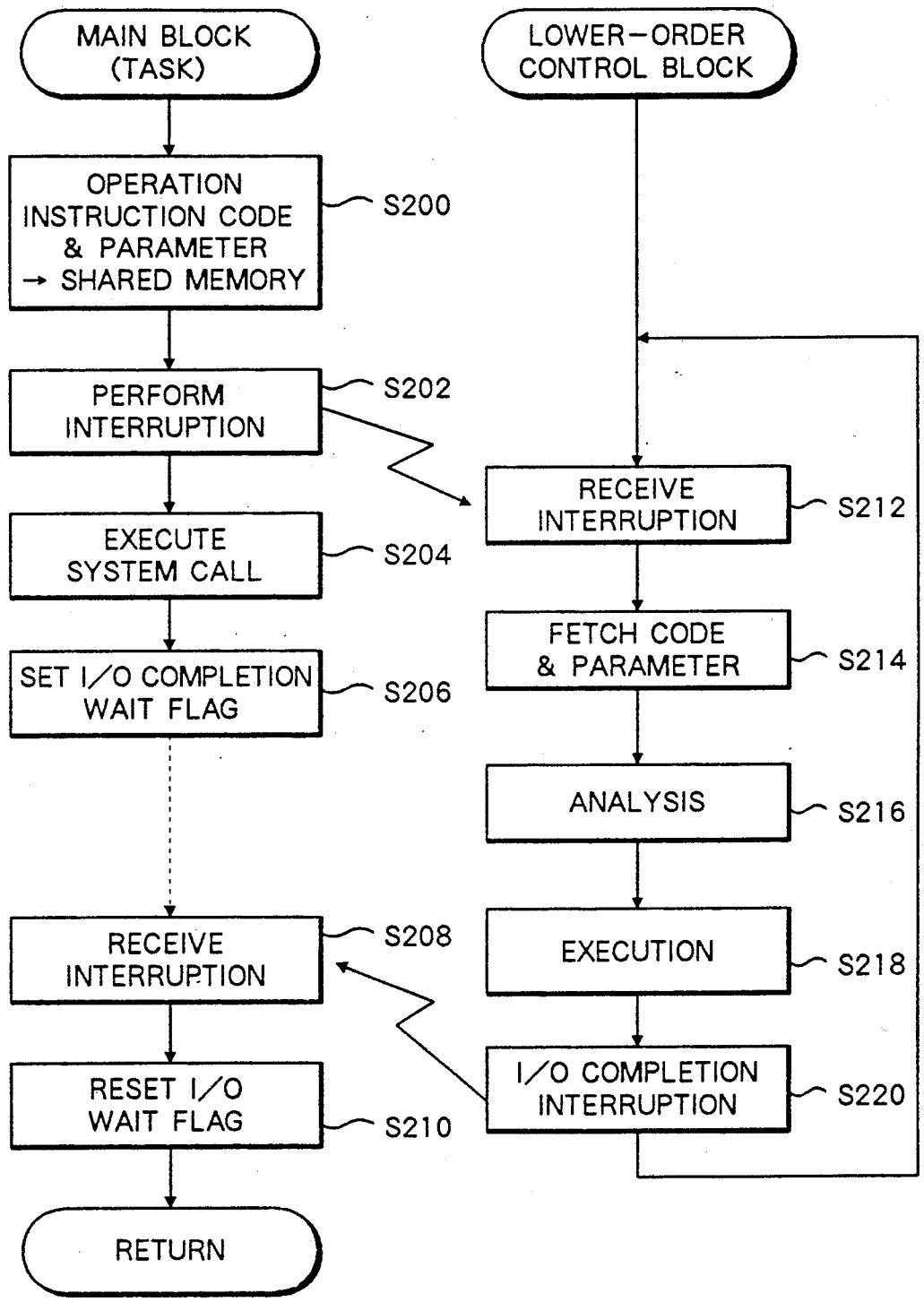

In control shown in FIG. 14, an interruption is used. However, instead of interruption, a polling scheme using a portion of a shared memory is also available. The control shown in FIG. 14 is also possible such that the CPU 805 of the main block sends the operation instruction code and the parameter onto the system bus 700 simultaneously with generation of an interruption, and the code and parameter are received by a microprocessor of the lower-order control block, without using the shared memory.

According to the present invention as described above, in the controller for the automatic assembling apparatus consisting of a plurality of objects to be controlled, in a host control unit, assembling operation units performing different operations under the multitask control are broken down to a difference in task programs, so that control of elements to be driven such as a servo motor and the like is converted to simplified operation control. Thus, when an object to be controlled is extended, a memory or a control board need only be added without extending a controller unlike in a conventional apparatus.

As many apparently widely different embodiments of the present invention can be made without departing from the spirit and scope thereof, it is to be understood that the invention is not limited to the specific embodiments thereof except as defined in the appended claims.

What is claimed is:

1. A controller for an automatic assembling apparatus comprising a plurality of operation units each of which has a plurality of input and output devices and which perform independent and different operations under program control, said operation units being operatively-tightly coupled with each other, said controller further comprising:
    a host control unit which stores a multi-task program, each task program of which describes the operation of a respective one of said plurality of operation units, for controlling the entire assembly operation by executing said multi-task program;
    a plurality of lower-order control units having control programs for controlling an independent operation of each of said plurality of said operation unit input and output devices according to the operation unit task programs stored in the host control unit;
    shared resource means which is connected to said host control unit and said plurality of lower-order control units, and is shared and accessed by said host control unit and said lower-order control units, for storing information necessary for the controls of said plurality of lower-order control units; and
    parallel bus means for transferring said information between said host control unit, said plurality of lower-order control units and said shared resource means, said parallel bus means comprising data signal lines and control signal lines.

2. The controller for the automatic assembling apparatus according to claim 1, wherein said devices include a motor, a sensor, and a solenoid.

3. The controller for the automatic assembling apparatus according to claim 1, wherein said shared resource means comprises a shared memory.

4. The controller for the automatic assembling apparatus according to claim 1, wherein said multi-task control program is stored in a local memory of said host control unit.

5. A controller for an automatic assembling apparatus comprising a plurality of operation units each of which has a plurality of input and output devices and which perform independent and different operations under program control, said operation units being operatively-tightly coupled with each other, said controller further comprising:
    a plurality of lower-order control units, having control programs for controlling an independent operation of a respective one of said plurality of operation unit input and output devices, for controlling said plurality of input and output devices by means of said control programs;
    a host control unit comprising:
    means for executing a multi-task program, each task program of which describes the operation of each of said plurality of operation units, for controlling the entire assembling operation by executing said multi-task program, said operation unit input and output devices being controlled by the control programs of the lower-order control units according to the task programs; and
    means for extracting from said multi-task program a step corresponding to an individual operation of each said device and for reducing the extracted step into a simplified command so that said simplified command may be interpreted and executed in said lower-order control unit;

means for transferring said simplified command to said low-order control units;

input/output means for inputting data to said host control unit and displaying data from said host control unit; and means for executing a handler program, which is under said multi-task control program, for exchanging input/output data between said input/output means and said host control unit.

6. The controller for the automatic assembling apparatus according to claim 5, wherein said means for executing the handler program comprises:

a plurality of port means one of which is assignable to said input/output means by said handler program;

a plurality of mail box means for exchanging data between the port means and the respective task programs; and register means for registering information which specifies a path between said input/output means and one of said task programs.

7. The controller for the automatic assembling apparatus according to claim 5, wherein the data input by said input/output means is a step for said multi-task program.

8. A controller for an automatic assembling apparatus comprising a plurality of operation units each of which has a plurality of input and output devices and which perform independent and, different operations under the program control, said operation units being operatively-tightly coupled with each other, said controller further comprising:

a plurality of lower-order control units, having control programs for controlling an independent operation of each of said plurality of operational unit input and output devices, for controlling said plurality of input and output devices by means of said control programs; and a host control unit comprising:

a multi-task program, each task program of which describes the operation of each of said plurality of operation units, for controlling the entire assembling operation by executing said multi-task program, said input and output devices being controlled by the control programs of the lower-order control units in accordance with the task programs;

means for executing said multi-task program;

means for extracting from said multi-task program a step corresponding to an individual operation of each said device and for reducing the extracted step into a simplified command so that said simplified command can be interpreted and executed in said lower-order control unit; and means for transferring said simplified command to said low-order control unit.

9. The controller for the automatic assembling apparatus according to claim 8, wherein said transferring means includes shared resource means which is connected to and is shared and accessed by said host control unit and plurality of lower-order control units, said resource means is queued with said reduced commands.

10. The controller for the automatic assembling apparatus according to claim 9, wherein said shared resource means comprising a shared memory and parallel bus means which connects said host control unit, said plurality of lower control units and said shared memory, said shared parallel bus means comprising data signal lines and control signal lines.

11. The controller for the automatic assembling apparatus according to claim 8, wherein said devices include a motor, a sensor, and a solenoid.

12. The controller for the automatic assembling apparatus according to claim 8, wherein said multi-task program is stored in a local memory of said host control unit.

13. A controller for an automatic assembling apparatus comprising a plurality of operation units each of which has a plurality of input and output devices and which perform independent, different operations under the program control, said operation units being operatively-tightly coupled with each other, said controller further comprising:

a host control unit executing a multi-task program expressed in a multi-task program method, the respective task programs of which describe the operations of the respective operation units;

a plurality of lower-order control units modularized for each said operation unit for executing a plurality of low-order control programs each of which controls an independent operation of each of said operation unit input and output devices according to the respective task programs.

14. The controller for the automatic assembling apparatus according to claim 13, wherein said output devices are servo motors and solenoids, and said input devices are sensors;

some of said plurality of lower-order control units are modularized for each said servo motor of each said operation unit; and the remaining of said plurality of lower-order control units is modularized so that it may control all solenoids and sensors of all the operation units.

15. The controller for the automatic assembling apparatus according to claim 13, wherein said host control unit further includes:

means for extracting from said multi-task program a step corresponding to an individual operation of each said device and for reducing the extracting step into a simplified command so that said simplified command can be interpreted and executed in said lower-order control unit; and means for transferring said simplified command to said low-order control unit.

16. The controller for the automatic assembling apparatus according to claim 15, wherein said transferring means includes shared resource means which is connected to and is shared and accessed by said host control unit and plurality of lower order control units, said resource means being queued with said reduced commands.

17. The controller for the automatic assembling apparatus according to claim 16, wherein said shared resource means comprises a shared memory and parallel bus means which connects said host control unit, said plurality of lower control units and said shared memory, said parallel bus means comprising data signal lines and control signal lines.

18. The controller for the automatic assembling apparatus according to claim 13, wherein said multi-task program is stored in a local memory of said host control unit.

* * * * *

UNITED STATES PATENT AND TRADEMARK OFFICE
CERTIFICATE OF CORRECTION

PATENT NO. : 5,032,975

DATED : July 16, 1991

INVENTOR(S) : TOSHIHIRO YAMAMOTO ET AL.

It is certified that error appears in the above-identified patent and that said Letters Patent is hereby corrected as shown below: On the Title page Item [30] FOREIGN APPLICATION PRIORITY DATA "Aug. 7, 1987 [JP] Japan.........62-291253" should read
    --Aug. 7, 1987 [JP] Japan.........62-196489
    Aug. 7, 1987 [JP] Japan.........62-196490--.

COLUMN 1

Line 59, "limitations," should read --limitation,--.

COLUMN 2

Line 30, "control" (first occurrence) should read --controls--.

COLUMN 3

Line 66, "FIGS. 10 through 10C" should read --FIGS. 10A through 10C--.

COLUMN 5

Line 32, "Maltitask" should read --Multitask--.

COLUMN 7

Line 59, "the" should be deleted.

UNITED STATES PATENT AND TRADEMARK OFFICE
CERTIFICATE OF CORRECTION

PATENT NO. : 5,032,975
DATED : July 16, 1991
INVENTOR(S) : TOSHIHIRO YAMAMOTO ET AL.

It is certified that error appears in the above-identified patent and that said Letters Patent is hereby corrected as shown below:

COLUMN 17

Line 31, "independent and," should read --independent and--.
    Line 66, "comprising" should read --comprises--.

COLUMN 18

Line 21, "units;" should read --units; and--.
    Line 53, "lower order" should read --lower-order--.

Signed and Sealed this

Twenty-third Day of February, 1993

Attest:

STEPHEN G. KUNIN

Attesting Officer      Acting Commissioner of Patents and Trademarks